(12) United States Patent
Gao et al.

(10) Patent No.: US 12,212,979 B2
(45) Date of Patent: Jan. 28, 2025

(54) TRANSMISSION CONTROL METHOD, SOUNDING REFERENCE SIGNAL TRANSMISSION METHOD, TERMINAL, BASE STATION AND MEDIUM

(71) Applicant: ZTE CORPORATION, Shenzhen (CN)

(72) Inventors: Bo Gao, Shenzhen (CN); Yu Ngok Li, Shenzhen (CN); Zhaohua Lu, Shenzhen (CN); Ke Yao, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/417,377

(22) Filed: Jan. 19, 2024

(65) Prior Publication Data

US 2024/0155372 A1    May 9, 2024

Related U.S. Application Data

(63) Continuation of application No. 17/266,988, filed as application No. PCT/CN2019/099444 on Aug. 6, 2019, now Pat. No. 11,910,202.

(30) Foreign Application Priority Data

Aug. 8, 2018 (CN) .......................... 201810899214.5

(51) Int. Cl.
*H04W 16/28* (2009.01)
*H04B 7/06* (2006.01)
*H04L 5/00* (2006.01)
*H04L 25/02* (2006.01)

(52) U.S. Cl.
CPC .......... *H04W 16/28* (2013.01); *H04B 7/0626* (2013.01); *H04L 5/0051* (2013.01); *H04L 25/0226* (2013.01)

(58) Field of Classification Search
CPC .... H04W 16/28; H04B 7/0626; H04L 5/0051; H04L 25/0226
See application file for complete search history.

(56) References Cited

U.S. PATENT DOCUMENTS

| | | | | |
|---|---|---|---|---|
| 2014/0146765 A1* | 5/2014 | Ji | ........................ | H04W 72/541 370/329 |
| 2015/0124691 A1* | 5/2015 | Li | ........................ | H04L 5/0035 370/312 |
| 2017/0005764 A1* | 1/2017 | Park | ...................... | H04W 8/005 |
| 2018/0279231 A1* | 9/2018 | Meng | ................... | H04W 52/146 |
| 2019/0109679 A1* | 4/2019 | Liu | ........................ | H04L 5/005 |
| 2019/0132851 A1* | 5/2019 | Davydov | ............ | H04W 72/541 |

(Continued)

*Primary Examiner* — Fahmida S Chowdhury
(74) *Attorney, Agent, or Firm* — Morgan, Lewis & Bockius LLP

(57) ABSTRACT

Provided is a transmission control method, sounding reference signal transmission method, terminal, base station and medium, wherein the transmission control method comprises: receiving the configuration information sent by the network side, the configuration information includes the association relationship between the grouping index and the first information, wherein, the first information has the association relationship with the channel or the reference signal; according to the grouping index and the configuration information, determining the receiving mode or sending mode of the channel or reference signal associated with the first information.

17 Claims, 5 Drawing Sheets

Receiving configuration information sent from a network side, the configuration information including an association relationship between a packet index and first information, where the first information has an association relationship with a channel or a reference signal — 101

Determining a receiving mode or a sending mode of the channel or the reference signal associated with the first information according to the packet index — 102

(56) References Cited

U.S. PATENT DOCUMENTS

| | | | |
|---|---|---|---|
| 2019/0190747 A1* | 6/2019 | Park | H04W 72/046 |
| 2020/0014523 A1* | 1/2020 | Huang | H04L 5/001 |
| 2020/0053607 A1* | 2/2020 | Ingale | H04L 5/0092 |
| 2020/0059286 A1* | 2/2020 | Xiong | H04W 48/16 |
| 2020/0059898 A1* | 2/2020 | Osawa | H04W 72/046 |
| 2020/0162133 A1* | 5/2020 | Harrison | H04W 52/248 |
| 2021/0007060 A1* | 1/2021 | Chen | H04W 52/242 |
| 2024/0155372 A1* | 5/2024 | Gao | H04L 25/0226 |

* cited by examiner

TRANSMISSION CONTROL METHOD, SOUNDING REFERENCE SIGNAL TRANSMISSION METHOD, TERMINAL, BASE STATION AND MEDIUM

CROSS-REFERENCES TO RELATED APPLICATIONS

This application is a continuation of U.S. patent application Ser. No. 17/266,988, filed on Feb. 8, 2021, now U.S. Pat. No. 11,910,202, which is a National Stage Application, filed under 35 U.S.C. 371, of International Patent Application No. PCT/CN2019/099444, filed on Aug. 6, 2019, which is based on and claims priority to Chinese Patent Application No. 201810899214.5 filed with the CNIPA Aug. 8, 2018, the disclosures of which are incorporated herein by reference in their entireties.

TECHNICAL FIELD

Embodiments of the present disclosure relate to, but are not limited to, a transmission control method, a sounding reference signal transmission method, a terminal, a base station and a medium.

BACKGROUND

The ultra-wide-bandwidth high-frequency band communication, namely millimeter wave communication, has become an important direction for the development of mobile communication in the future and attracts the attention of academic and industrial circles around the world. In particular, nowadays, with increasingly congested spectrum resources and massive access to physical networks, the advantages of millimeter waves have become increasingly attractive. Many standard organizations such as an Institute of Electrical and Electronics Engineers (IEEE) and a 3rd Generation Partnership Project (3GPP) have started corresponding standardization efforts. For example, in 3GPP standard groups, high-frequency band communications have become an important innovation point of the New Radio Access Technology (New RAT) of the 5th Generation mobile communication system (5G) because of its significant advantage in wide bandwidths.

For the base station, there may be multiple antenna panels, and each antenna panel may generate multiple beams, and the similar phenomenon also exists at the user equipment (UE) side. In the 5G communication system in the related art, at the same time, the analog beam is assumed not to collide. However, with the increase of antenna panels at the UE and base station sides, channels and reference signals (RSs) with different spatial relationships or under different uplink sending spatial filters can be simultaneously sent for different antenna panels. Therefore, for the case of supporting multiple antenna panels or under multi-panel, the problem of insufficient flexibility for the uplink multi-beam collision needs to be solved.

SUMMARY

The embodiments of the present application provide a transmission control method, a sounding reference signal transmission method, a terminal, and a computer-readable storage medium.

At least one embodiment of the present application provides a transmission control method. The method includes the steps described below.

Configuration information sent from a network side is received, where the configuration information includes an association relationship between a group index and first information, and the first information has an association relationship with a channel or a reference signal.

A receiving mode or a sending mode of the channel or the reference signal associated with the first information is determined according to the group index.

At least one embodiment of the present application provides a transmission control method. The method includes the steps described below.

Configuration information of information elements sent from a network side is received, where the configuration information satisfies at least one of the following conditions in response to the information elements being transmitted simultaneously: spatial relationships or spatial filters associated with the information elements are the same, or spatial relationships or spatial filters associated with the information elements under the same group are the same.

The information elements are transmitted according to the configuration information.

At least one embodiment of the present application provides a transmission control method. The method includes the steps described below.

Configuration information is sent to a terminal, where the configuration information includes an association relationship between a group index and first information, and the first information has an association relationship with a channel or a reference signal.

A receiving mode or a sending mode of the channel or the reference signal associated with the first information is determined according to the group index.

At least one embodiment of the present application provides a transmission control method. The method includes the steps described below.

Configuration information of information elements is sent to a terminal, where the configuration information satisfies at least one of the following conditions in response to the information elements being transmitted simultaneously: spatial relationships or spatial filters associated with the information elements are the same, or spatial relationships or spatial filters associated with the information elements under the same group are the same.

The information elements are transmitted according to the configuration information.

At least one embodiment of the present application provides a terminal. The terminal includes a memory and a processor, where the memory stores a program which, when read and executed by the processor, implements the transmission control method described in any one of the above embodiments.

At least one embodiment of the present application provides a base station. The base station includes a memory and a processor, where the memory stores a program which, when read and executed by the processor, implements the transmission control method described in the above embodiment.

At least one embodiment of the present application provides a computer-readable storage medium. The computer-readable storage medium stores one or more programs executable by one or more processors to implement the transmission control method described in any one of the above embodiments.

At least one embodiment of the present application provides a sounding reference signal (SRS) transmission method. The method includes the steps described below.

Configuration information sent from a network side for an SRS is received, where the configuration information indicates that the SRS includes N SRS resource sets, and each of the N SRS resource sets includes at least one SRS resource, where N is a positive integer greater than or equal to 1.

The SRS is sent to the network side according to the configuration information.

At least one embodiment of the present application provides an SRS transmission method. The method includes the steps described below.

Configuration information for an SRS is sent to a terminal, where the configuration information indicates that the SRS includes N SRS resource sets, and each of the N SRS resource sets includes at least one SRS resource, where N is a positive integer greater than or equal to 1.

The SRS sent by the terminal according to the configuration information is received.

At least one embodiment of the present application provides a terminal. The terminal includes a memory and a processor, where the memory stores a program which, when read and executed by the processor, implements the SRS transmission method described in any one of the above embodiments.

At least one embodiment of the present application provides a base station. The base station includes a memory and a processor, where the memory stores a program which, when read and executed by the processor, implements the SRS transmission method described in the above embodiment.

At least one embodiment of the present application provides a computer-readable storage medium. The computer-readable storage medium stores one or more programs executable by one or more processors to implement the SRS transmission method described in any one of the above embodiments.

Compared to the related art, in at least one embodiment of the present application, a group index related to a physical resource is associated with first information so that the physical resource can be refined or the physical resource conflict can be avoided.

BRIEF DESCRIPTION OF DRAWINGS

The drawings are used to provide a further understanding of the solution of the present application and constitute a part of the specification. In conjunction with embodiments of the present application, the drawings are intended to illustrate and not to limit the solution of the present application.

DETAILED DESCRIPTION

To illustrate the object, solutions, and advantages of the present application clearer, the embodiments of the present application will be described hereinafter in detail in conjunction with the drawings. It is to be noted that if not in collision, the embodiments described herein and the features thereof may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

As used herein, the spatial relationship, also referred to as spatial relationship information, carries one or more reference RSs to represent or indicate an uplink spatial filter of an associated RS or a channel (also referred to as target RS or target channel). Alternatively, the RS or the channel (also referred to as target RS or target channel) is configured with one piece of spatial relationship information so that a UE determines the uplink spatial filter of the RS or the channel.

That the spatial relationships are different means that the reference RSs in spatial relationships associated with multiple RSs or channels are different.

That the spatial relationships are the same means that the reference RSs in spatial relationships associated with multiple RSs or channels are the same or that these RSs themselves are the same.

Furthermore, when the reference RS is configured with the spatial relationship information, the reference RSs in the associated spatial relationship are reference RSs after the spatial relationship information is nested one or more times.

The reference RS consists of at least one of: an RS resource index, an RS set index, an RS configuration index, or a group index.

In the present application, the beam may be a kind of resource (such as a sending end spatial filter, a receiving end spatial filter, sending end precoding, receiving end precoding, an antenna port, an antenna weight vector, and an antenna weight matrix), and the beam sequence number may be replaced with a resource index (such as a reference signal resource index) since the beam may be bound to some time-frequency code resources for transmission. The beam may also be a transmission (sending or receiving) manner, and the transmission manner may include space-division multiplexing, frequency domain or time domain diversity and the like.

In the present application, the second frequency band, also referred to as Frequency Range 2 (FR2), represents a frequency band greater than 6 GHz.

In at least one embodiment, the group index is associated with an SRS resource set, a demodulation reference signal (DMRS) port group, a cell group, or a physical uplink control channel (PUCCH) group that is used for beam management.

Figure 1:
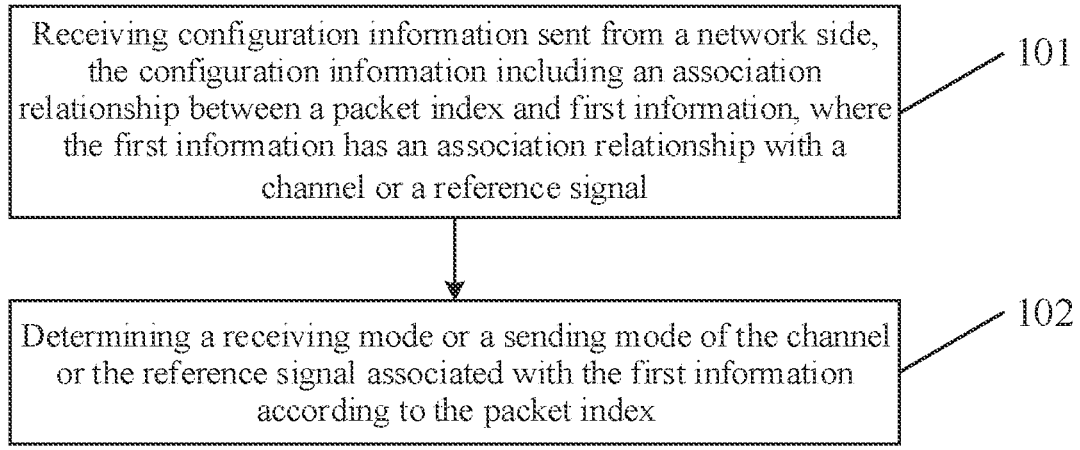
FIG. 1 is a flowchart of a transmission control method according to an embodiment of the present application.

As shown in FIG. 1, an embodiment of the present application provides a transmission control method. The method includes steps described below.

In step 101, configuration information sent from a network side is received, where the configuration information includes an association relationship between a group index and first information, and the first information has an association relationship with a channel or a reference signal.

In step 102, a receiving mode or a sending mode of the channel or the reference signal associated with the first information is determined according to the group index.

There is an association relationship between the group index and a physical resource group. The physical resource group may be a group consisting one or more beams, a group consisting of spatial filters, a group consisting of panels, or a group consisting of antennas.

In the solution provided by the embodiment, the physical resource can be refined or the physical resource conflict can be avoided through the association between the first information and the group. For example, when the physical resource is an antenna panel, since each panel can only generate a unique sending beam at one time point or receive beam at one time point, the antenna panel may be directly associated with a transmission node during the transmission of multiple Transmission and Reception Points (TRPs), thereby effectively avoiding collision of beam scheduling between nodes.

In an embodiment, the step in which the receiving mode or the sending mode of the channel or the reference signal associated with the first information is determined according to the group index includes: transmitting the channel or the reference signal associated with the first information using a physical resource group associated with the group index.

In an embodiment, the first information includes at least one of: spatial relationship information, an SRS resource, an SRS resource set, a channel state information RS resource, a channel state information RS resource set, a DMRS port group, a cell group, a control resource set, or an uplink control channel group.

The reference signal includes at least one of: an uplink reference signal or a downlink reference signal.

The uplink reference signal includes at least one: an SRS, a phase-tracking reference signal (PT-RS), or a demodulation reference signal (DMRS).

The downlink reference signal includes at least one of: a channel state information reference signal (CSI-RS), a phase-tracking reference signal (PT-RS), a synchronization signal block (SSB), a synchronization signal/physical broadcast channel (SS/PBCH), a downlink DMRS, or a CSI-RS for tracking.

The group index includes at least one of: an RS resource index, an RS port set index, an RS resource set index, an RS configuration index, an RS group index in a channel state information report, or a control resource set index. In an embodiment, the RS resource index, for example, is an SRS index or a CSI-RS index, the RS port set index, for example, is an SRS or CSI-RS port set index, the RS resource set index, for example, is an SRS or CSI-RS resource set index, the RS configuration index, for example, is an SRS or CSI-RS configuration index, and the RS group index in the channel state information report, for example, is an SRS or CSI-RS group index in the channel state information report.

In an embodiment, a group associated with the group index includes at least one of: a class A group, a class B group, or a class C group. One group is one physical resource group. The physical resource group may only be the class A group, or may only be the class B group, or may only be the class C group, or the group may be partly the class group and partly the class B group.

Each group in the class A group includes one or more antenna panels or includes one or more panels or one or more antenna matrices.

Each group in the class B group includes one or more antenna sub-panels or includes one or more sub-panels or one or more antenna sub-matrices.

The class C group is referred to as beam group, and each group in the class C group includes one or more beams.

In an embodiment, a reference channel or a signal associated with the class A group satisfies at least one of: RSs or channels associated with different groups are capable of being sent simultaneously, where the RS or channel associated with the group is an RS or a signal transmitted by using this group; RSs or channels associated with different groups are capable of being received simultaneously; RSs or channels associated with the same group are not capable of being sent simultaneously, or RSs or channels that are associated with the same group and that have different spatial relationships or different spatial filters are not capable of being sent simultaneously; or RSs or channels associated with the same group are not capable of being received simultaneously, or RSs or channels that are associated with the same group and that have different spatial relationships or different spatial filters are not capable of being received simultaneously.

For example, in a case where there are two panels, a first panel and a second panel, the RS or channel associated with the first panel and the RS or channel associated with the second panel can be sent or received simultaneously while multiple RSs or channels associated with the first panel cannot be sent or received simultaneously.

In an embodiment, the reference channel or signal associated with the class A group satisfies at least one of: no more than E RSs or channels associated with the same group are capable of being sent simultaneously, or no more than E RSs or channels that are associated with the same group and that have different spatial relationships or different spatial filters are capable of being sent simultaneously; no more than E RSs or channels associated with the same group are capable of being received simultaneously, or no more than E RSs or channels that are associated with the same group and that have different spatial relationships or different spatial filters are capable of being received simultaneously; more than E RSs or channels associated with the same group are not capable of being sent simultaneously, or more than E RSs or channels that are associated with the same group and that have different spatial relationships or different spatial filters are not capable of being sent simultaneously; or more than E RSs or channels associated with the same group are not capable of being received simultaneously, or more than E RSs or channels that are associated with the same group and that have different spatial relationships or different spatial filters are not capable of being received simultaneously.

The class A group includes E class B groups, where E is an integer greater than or equal to 1. For example, in a case where a panel includes three sub-panels, for the same group, no more than three RSs or channels can be sent or received simultaneously while more than three RSs or channels cannot be sent or received simultaneously.

In an embodiment, the reference channel or signal associated with the class B group satisfies at least one of: RSs or channels associated with different groups are capable of being sent simultaneously; RSs or channels associated with different groups are capable of being received simultaneously; RSs or channels associated with the same group are not capable of being sent simultaneously, or RSs or channels that are associated with the same group and that have different spatial relationships or different spatial filters are not capable of being sent simultaneously; or RSs or channels associated with the same group are not capable of being received simultaneously, or RSs or channels that are associated with the same group and that have different spatial relationships or different spatial filters are not capable of being received simultaneously.

In an embodiment, the reference channel or signal associated with the class C group satisfies at least one of: RSs or channels associated with different groups are not capable of being sent simultaneously; RSs or channels associated with different groups are not capable of being received simultaneously; RSs or channels associated with the same group are capable of being sent simultaneously, or RSs or channels that are associated with the same group and that have different spatial relationships or different spatial filters are capable of being sent simultaneously; or RSs or channels associated with the same group are capable of being received simultaneously, or RSs or channels that are associated with the same group and that have different spatial relationships or different spatial filters are capable of being received simultaneously.

Figure 2:
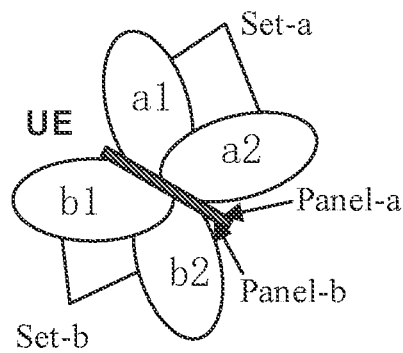
FIG. 2 is a schematic diagram illustrating the association between a group index and an SRS resource set according to the present application.
Figure 2:
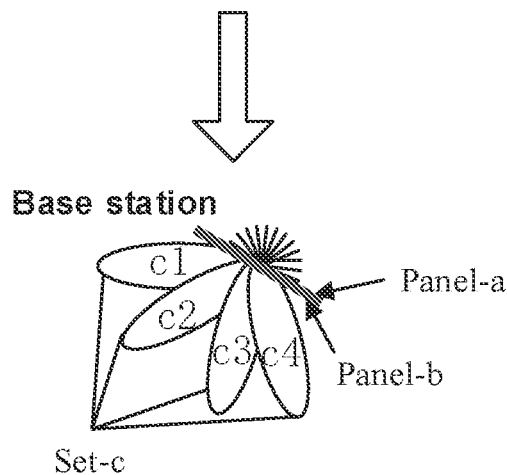

FIG. 2 is a schematic diagram illustrating the association between a group index and a cell group according to the present application. The UE end has two antenna panels, that is, panel-a and panel-b. The UE ends informs the base station of its capability, and the base station configures two SRS resource sets (set-a and set-b in this embodiment) to the UE end so that beam training is performed for two panels on the UE end. In each SRS resource set, two SRS resources are configured, that is, two different beams, where set-a includes SRS resources a1 and a2 and set-b includes SRS resources b1 and b2. Based on the measurement of SRS receiving quality, the base station chooses to use panel-a for subsequent transmission, and the base station configures SRS resource set-c (including four SRS resources: c1, c2, c3, and c4) and associates the SRS resources set-c with set-b to refine beams under the antenna panel associated with set-b. Therefore, the UE end uses the antenna panel (or antenna group) associated with set-b to send the SRS resource set-c. That is, in the embodiment, the first information is an SRS resource set (set-c), and the group index is set-b. The beam refinement is performed on the panel by associating set-c and set-b (set-b has two SRS resources, set-c has four resources, to refine beams under the antenna panel associated with set-b).

In an embodiment, the base station may first configure a small amount of SRS resources to determine to use which panel and then perform beam refinement under one or more panels relatively ideally. Therefore, the overhead of panel choosing can be effectively saved, thereby improving the efficiency of beam training. For example, in the embodiment shown in FIG. 2, set-b is transmitted on panel-a, set-c is also transmitted on panel-a after set-b and set-c are associated with each other, and since set-c has four SRS resources, panel-a can be refined.

Figure 3:
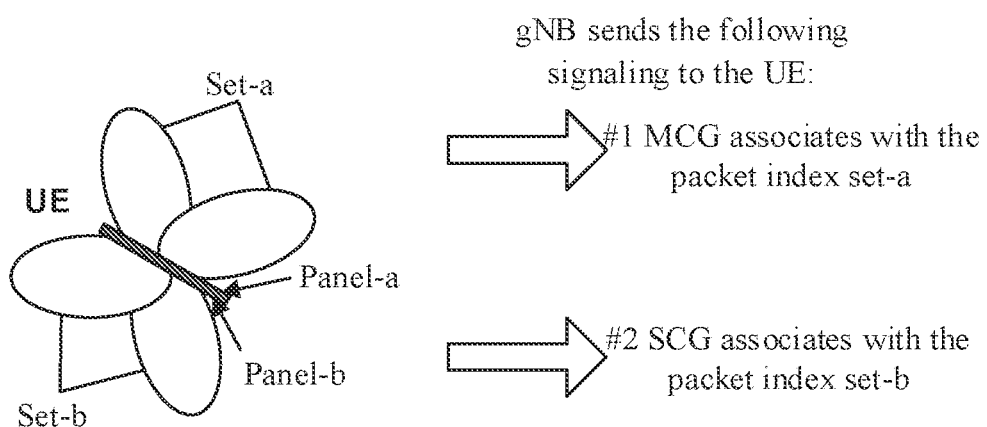
FIG. 3 is a schematic diagram illustrating the association between a group index and a cell group according to the present application.

FIG. 3 is a schematic diagram illustrating the association between a group index and a cell group according to the present application. In a scenario of new radio-new radio (NR-NR, also referred to as 5G-5G) direct communication (DC), the base station first configures two SRS resource sets for two panels of the UE, and according to results measured in real time, the base station end may associate a master cell group (MCG) and a secondary cell group (SCG) with panels of the UE, respectively, and since beams generated by two panels of the UE end are decoupled, these beams can cooperate well with the independent beam management and transmission under MCG and SCG.

For example, the base station sends signaling to the UE to make MCG associate with the group index set-a and SCG associate with the group index set-b.

In another embodiment, an RS resource set index (representing an antenna panel index on the UE side) is associated with a cell group so that all transmissions of the cell group are performed based only on physical resources indicated by the RS resource set index. Therefore, as long as the base station side configures different RS resource set indexes for different cell groups, use conflicts of physical resources of the same user side between different cells can be avoided.

In at least one embodiment of the present application, there is an association between multi-layer downlink/uplink (DL/UL) RS resource sets, and the spatial filter falls back to the first layer RS index by default in presence of collision (or the first layer RS index/bandwidth part (BWP) identifier (ID)/cell ID must be identical).

Figure 4:
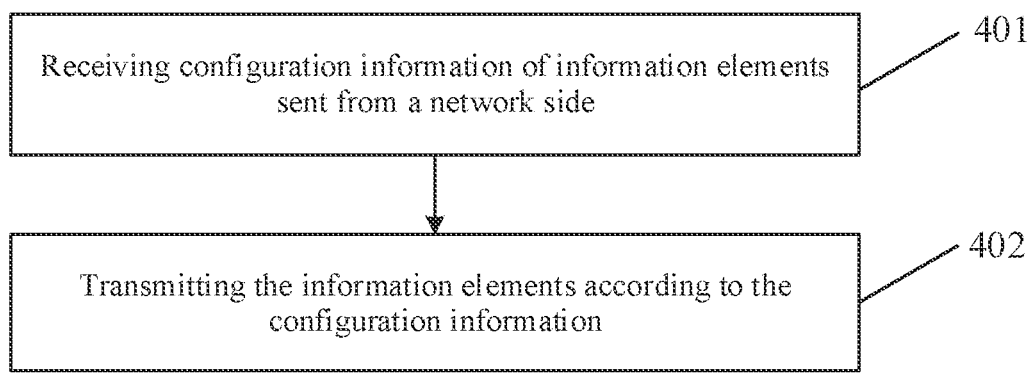
FIG. 4 is a flowchart of a transmission control method according to an embodiment of the present application.

As shown in FIG. 4, an embodiment of the present application provides a transmission control method. The method includes the steps described below.

In step 401, configuration information of information elements sent from a network side is received, where the configuration information satisfies at least one of the following conditions in response to the information elements being transmitted simultaneously:

spatial relationships associated with the simultaneously transmitted information elements are the same, or spatial filters associated with the simultaneously transmitted information elements are the same; or spatial relationships associated with the simultaneously transmitted information elements under the same group are the same, or spatial filters associated with the simultaneously transmitted information elements under the same group are the same.

In step 402, the information elements are transmitted according to the configuration information.

In step 401, the group refers to the physical resource group.

In the solution provided by the embodiment, the spatial relationships are restricted, and when the channel or signal is associated with a multi-layer spatial relationship, the channel or signal can be back to the same spatial relationship or the same spatial filter, thereby avoiding the collision.

In an embodiment, in response to part of information elements in the information elements not being configured with spatial relationship information, a spatial relationship or a spatial filter associated with the part of information elements not being configured with the spatial relationship information in the information elements is determined according to at least one of the following: determining the spatial relationship of the part of information elements not being configured with the spatial relationship according to spatial relationship information of information elements configured with spatial relationship information; determining the spatial filter of the part of information elements not configured with the spatial relationship according to spatial relationship information of information elements configured with spatial relationship information; or determining the spatial filter of the part of information elements not configured with the spatial relationship according to a spatial filter associated with spatial relationship information of information elements configured with spatial relationship information.

The network side, for example, is a base station.

The information elements include at least one of: A1 RSs, A2 data channels, or A3 control channels, where A1, A2, and A3 are integers greater than or equal to 1, or values of A1, A2, and A3 may be set according to requirements.

In an embodiment, the spatial relationships being the same includes the presence of at least one RS that simultaneously is an RS associated with the information elements.

In an embodiment, the RS is located in a preset cell, a preset carrier, a preset BWP, a preset control resource set, a preset uplink control channel group, a preset group, or a preset RS resource set.

In an embodiment, the RS is located in a master cell or a master carrier.

In an embodiment, the information elements, for example, are uplink information elements.

In an embodiment, in response to the information elements including an uplink RS, the RS associated with the information elements includes at least one of: the uplink RS, or an RS associated with spatial relationship information of the uplink RS.

In an embodiment, in response to the information elements including an uplink data channel, the RS associated with the information elements includes at least one of: an uplink RS associated with the uplink data channel; an RS associated with spatial relationship information of an uplink RS associated with the uplink data channel; or an RS associated with spatial relationship information of an uplink control channel associated with the uplink data channel.

In an embodiment, the uplink RS associated with the uplink data channel is used for a codebook mode, or the uplink RS associated with the uplink data channel is used for a non-codebook mode.

In an embodiment, in response to the information elements including an uplink control channel, the RS associated with the information elements includes an RS associated with a spatial relationship of the uplink control channel.

Figure 5:
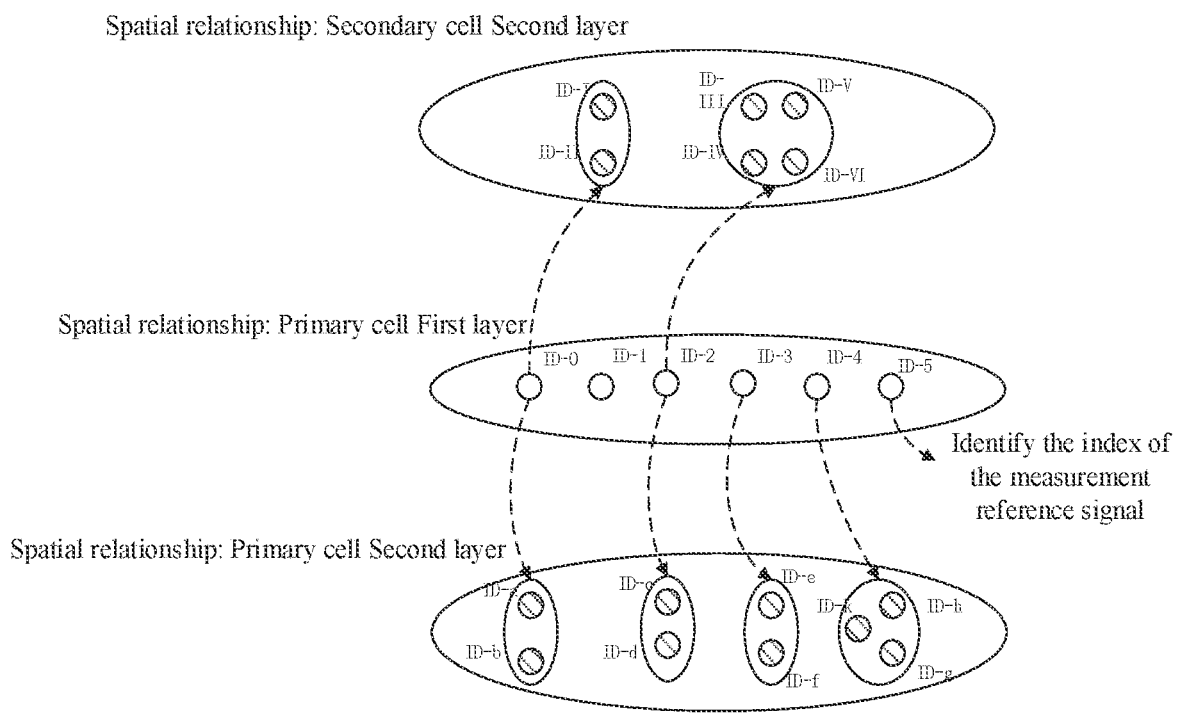
FIG. 5 is a schematic diagram illustrating spatial relationship management under multiple layers according to the present application.

FIG. 5 is a schematic diagram illustrating spatial relationship management under multiple layers according to the present application. In a primary cell (Pcell), the base station configures a first layer of beam training RSs, that is, ID-0 to ID-5 in FIG. 5, where each ID can be used for identifying a measurement RS. At the first layer, a basic back-off pool is established between the base station and the UE. The beam refinement is then performed for Pcell and a secondary cell (Scell) under the RS indexes that are favorable to Pcell and Scell. As shown in FIG. 5, in Pcell, beam refinement is performed on ID-0, ID-2, ID-3, and ID-4, and each of these IDs is associated with multiple uplink RSs, that is, IDs at the second layer. Specifically, ID-0 is associated with ID-a and ID-b, ID-2 is associated with ID-c and ID-d, ID-3 is associated with ID-e and ID-f, and ID-4 is associated with ID-g, ID-h, and ID-k. In subsequent data transmissions, Pcell generally uses the IDs at the second layer to indicate the spatial relationship.

In Scell, beam refinement is performed on ID-0 and ID-2, where each of the two IDs is associated with multiple uplink RSs, that is, IDs at the second layer. Specifically, ID-0 is associated with ID-I and ID-II, and ID-2 is associated with ID-III, ID-IV, ID-V, and ID-VI. In subsequent data transmissions, Scell generally uses the IDs at the second layer to indicate the spatial relationship.

When simultaneous transmission of channels in Pcell and Scell occurs, according to the condition in step 401, that is, spatial relationships associated with the simultaneously transmitted information elements under the same group are the same or spatial filters associated with the simultaneously transmitted information elements under the same group are the same, the spatial relationship of the Pcell and Scell channel transmissions may fall back to the associated beam index pool at the first layer. As a restriction condition configured and indicated by the base station, Pcell and Scell need to fall back to the same index or fall back to the requirement of a different index, where the requirement cannot exceed the capability of the UE side (for example, for the same UE panel, the same spatial relationship is required while for different UE panels, there is no requirement).

For example, in a slot, that is, slot-n, the uplink data channels of Scell and Pcell are instructed to use ID-II and ID-a, respectively, as spatial relationship information for determining their corresponding spatial filters. Since the spatial relationship information of the uplink data channel of Scell falls back to ID-0, the spatial relationship information of the uplink control channel of Pcell falls back to ID-0. Therefore, in the perspective of the UE side, the spatial relationship is determined according to ID-0, that is, a corresponding spatial filter is generated, for sending the uplink data channels of Pcell and Scell.

In at least one embodiment of the present application, in order to ensure the validity of the beam training and data transmission stages, necessary constraints are performed on the user-side behavior of the uplink SRS or the configuration of the base station side. Specifically, configuration constraint is performed on SRSs associated with the physical uplink shared channel (PUSCH) transmission.

Figure 6:
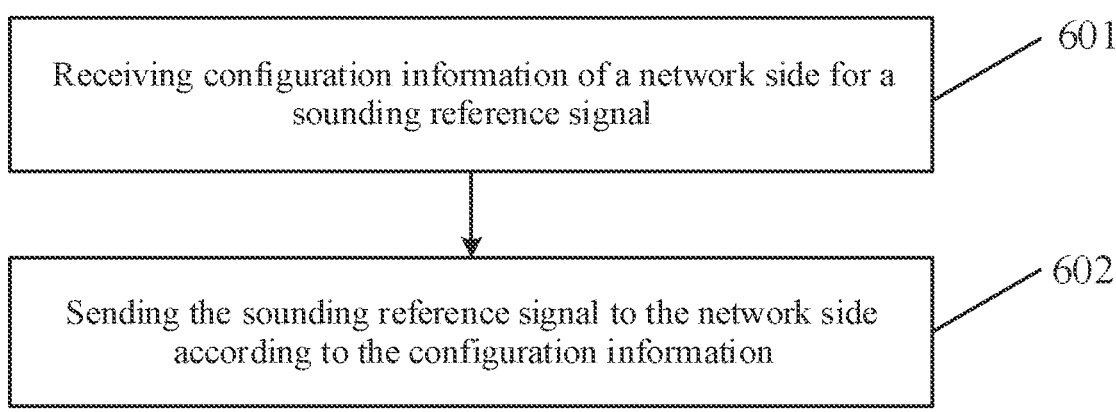
FIG. 6 is a flowchart of an SRS transmission method according to an embodiment of the present application.

As shown in FIG. 6, an embodiment of the present application provides an SRS transmission method. The method includes the steps described below.

In step 601, configuration information of a network side for an SRS is received, where the configuration information indicates that the SRS includes N SRS resource sets, and each of the N SRS resource sets includes at least one SRS resource, where N is a positive integer greater than or equal to 1.

In step 602, the SRS is sent to the network side according to the configuration information.

The network side, for example, is a base station.

The value of N may be set according to requirements.

In an embodiment, the at least one SRS resource in the same SRS resource set is associated with different spatial relationship information, or the at least one SRS resource in the same SRS resource set is associated with different spatial filters. That is, spatial relationships or spatial filters associated with SRS resources in the same SRS resource set are different. For example, for three SRS resources, that is, SRS1, SRS2, and SRS3, SRS1 is associated with a first spatial relationship, SRS2 is associated with a second spatial relationship, and SRS3 is associated with a third spatial relationship, and the first spatial relationship, the second spatial relationship, and the third spatial relationship are different from each other.

In the solution provided by the embodiment, the utilization rate of the SRS can be improved. When the SRS is used for uplink channel measurement, in the same SRS resource set, when the SRS resources are configured with the same spatial relationship, the measurement capability of measurement for different spatial relationships is restricted while the same spatial relationship is repeatedly measured, which is not conducive to improving the performance of uplink transmission. For example, under the non-codebook transmission, the two SRS resources are configured with the same spatial relationship, which means that the spatial filters used by the two SRS are the same, and thus the measurement and channel estimation for different spatial filters cannot be improved well. When different spatial relationships or spatial filters are associated, the measurement can be performed based on different spatial relationships, thereby improving the utilization rate of the SRS.

In an embodiment, the at least one SRS resource in the same SRS resource set is each configured with spatial relationship information or is not configured with spatial relationship information.

In an embodiment, the at least one SRS resource in the same SRS resource set being associated with different spatial filters includes: in response to the at least one SRS resource in the same SRS resource set each not being configured with the spatial relationship information, the at least one SRS resource in the same SRS resource set is associated with different spatial filters.

The SRS is used for at least one of: a codebook transmission, a non-codebook transmission, or beam management.

In an embodiment, in response to the SRS being used for the non-codebook transmission, at least one of the following is included: if each SRS resource is configured with spatial relationship information, spatial relationship information associated with each SRS resource is different; or if no SRS resource is configured with spatial relationship information, the spatial filter associated with each SRS resource is different.

In an embodiment, the each SRS resource being associated with different spatial relationship information includes: each SRS resource in the same SRS resource set is associated with different spatial relationship information.

In an embodiment, that the spatial filter associated with each SRS resource is different refers to: each SRS resource in the same SRS resource set is associated with different spatial filters.

In an embodiment, the method further includes: in response to the SRS being used for the non-codebook transmission, at least one of the following in the SRS needs to be configured: spatial relationship information or associated CSI-RS information.

In an embodiment, in a case where the SRS is used for the beam management, the number of SRS resources in each SRS resource set is less than or equal to the maximum number of SRS resources in each associated SRS resource set in user capability information.

In an embodiment, in a case where the SRS is used for beam management and each SRS resource is not configured with spatial relationship information, SRS resources are associated with different spatial filters.

In an embodiment, in a case where the SRS is used for beam management and SRS resources in the same SRS resource set are associated with different spatial filters.

In an embodiment, the method further satisfies at least one of the following conditions: a quasi co-location spatial parameter is capable of being configured, spatial relationship information is capable of being configured, or the SRS is in a second frequency band. That is, the terminal supports the quasi co-location spatial parameter, or the terminal supports the spatial relationship information.

In summary, based on the solution provided in the embodiment of the present invention, a group is bound to a transmission resource through an uplink RS or a channel group, and spatial relationships (or spatial filters) under multiple layers can fall back through the configuration constraint of spatial relationship information, thereby effectively relieving the contradiction between the uplink beam scheduling conflict and the excessive limitation of uplink resource scheduling and thus effectively improving the system performance.

Figure 7:
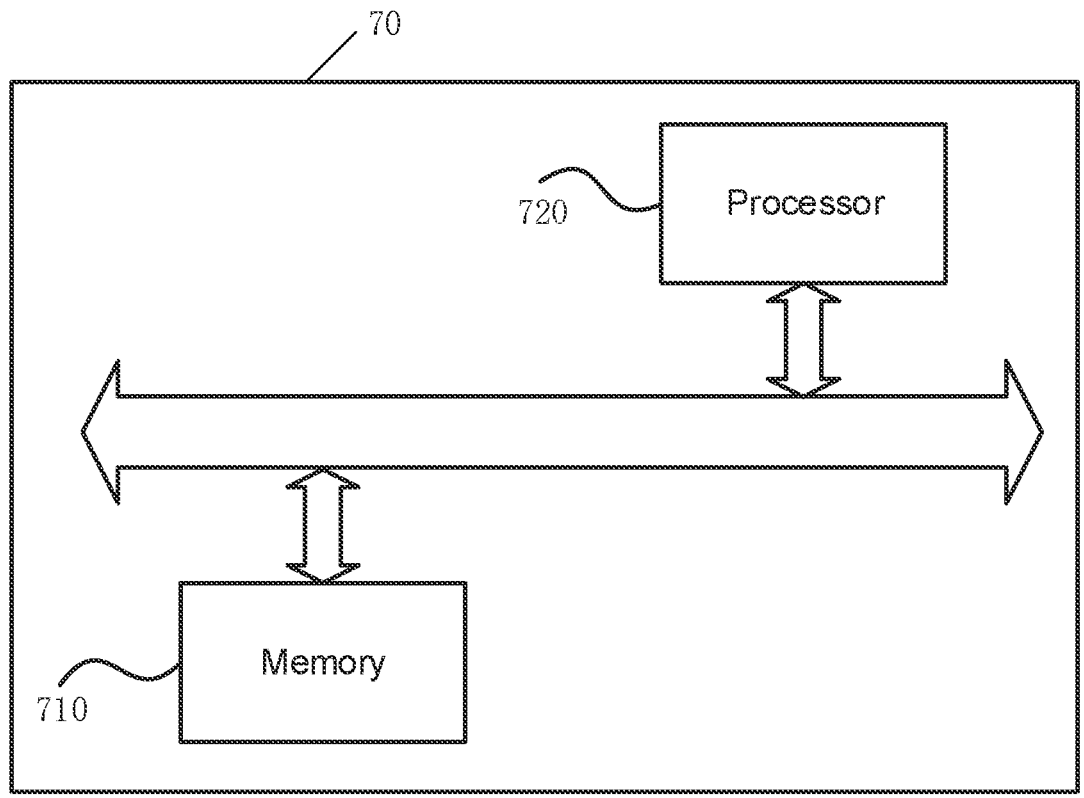
FIG. 7 is a block diagram of a terminal according to an embodiment of the present application.

As shown in FIG. 7, an embodiment of the present disclosure provides a terminal 70. The terminal 70 includes a memory 710 and a processor 720, where the memory 710 stores a program which, when read and executed by the processor 720, implements the transmission control method described in any one of the above embodiments.

Figure 8:
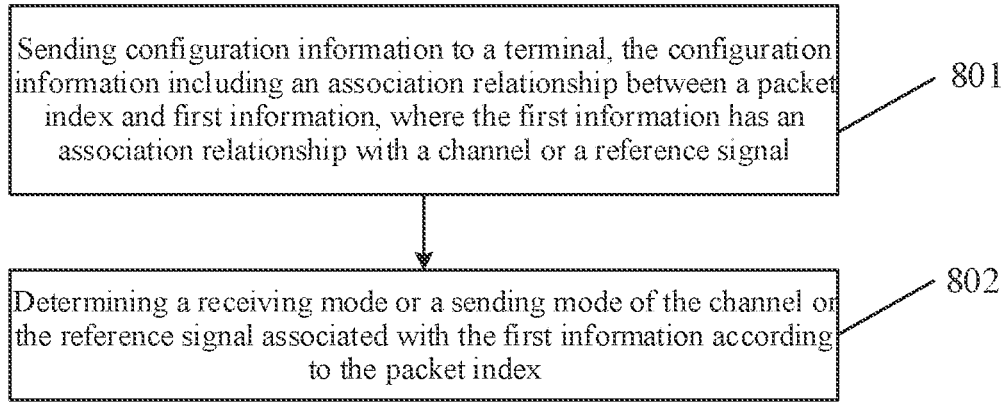
FIG. 8 is a flowchart of a transmission control method on a base station side according to an embodiment of the present application.

As shown in FIG. 8, an embodiment of the present application provides a transmission control method. The method includes the steps described below.

In step 801, configuration information is sent to a terminal, where the configuration information includes an association relationship between a group index and first information, and the first information has an association relationship with a channel or a reference signal.

In step 802, a receiving mode or a sending mode of the channel or the reference signal associated with the first information is determined according to the group index.

In an embodiment, the step in which the receiving mode or the sending mode of the channel or the reference signal associated with the first information is determined according to the group index includes: transmitting the channel or the reference signal associated with the first information using a physical resource group associated with the group index.

In an embodiment, the first information includes at least one of: spatial relationship information, an SRS resource, an SRS resource set, a CSI-RS resource, a CSI-RS resource set, a DMRS port group, a cell group, a control resource set, or an uplink control channel group.

In an embodiment, the group index includes at least one of: an RS resource index, an RS port set index, an RS resource set index, an RS configuration index, an RS group index in a CSI report, or a control resource set index.

In an embodiment, the step in which the receiving mode or the sending mode of the channel or the reference signal associated with the first information is determined according to the group index includes: transmitting the channel or the reference signal associated with the first information using a physical resource group associated with the group index.

In an embodiment, a group associated with the group index includes at least one of: a class A group, a class B group, or a class C group.

In an embodiment, each group in the class A group includes one or more antenna panels.

In an embodiment, each group in the class B group includes one or more antenna sub-panels.

In an embodiment, each group in the class C group includes one or more beams.

In an embodiment, the reference channel or signal associated with the class A group satisfies at least one of: RSs or channels associated with different groups are capable of being sent simultaneously; RSs or channels associated with different groups are capable of being received simultaneously; RSs or channels associated with the same group are not capable of being sent simultaneously, or RSs or channels that are associated with the same group and that have different spatial relationships or different spatial filters are not capable of being sent simultaneously; or RSs or channels associated with the same group are not capable of being received simultaneously, or RSs or channels that are associated with the same group and that have different spatial relationships or different spatial filters are not capable of being received simultaneously.

In an embodiment, the reference channel or signal associated with the class A group satisfies at least one of: no more than E RSs or channels associated with the same group are capable of being sent simultaneously, or no more than E RSs or channels that are associated with the same group and that have different spatial relationships or different spatial filters are capable of being sent simultaneously; no more than E RSs or channels associated with the same group are capable of being received simultaneously, or no more than E RSs or channels that are associated with the same group and that have different spatial relationships or different spatial filters are capable of being received simultaneously; more than E RSs or channels associated with the same group are not capable of being sent simultaneously, or more than E RSs or channels that are associated with the same group and that have different spatial relationships or different spatial filters are not capable of being sent simultaneously; or more than E RSs or channels associated with the same group are not capable of being received simultaneously, or more than E RSs or channels that are associated with the same group and that have different spatial relationships or different spatial filters are not capable of being received simultaneously; where E is an integer greater than or equal to 1.

In an embodiment, the class A group includes E class B groups, where E is an integer greater than or equal to 1.

In an embodiment, the reference channel or signal associated with the class B group satisfies at least one of: RSs or channels associated with different groups are capable of being sent simultaneously; RSs or channels associated with different groups are capable of being received simultaneously; RSs or channels associated with the same group are not capable of being sent simultaneously, or RSs or channels that are associated with the same group and that have different spatial relationships or different spatial filters are not capable of being sent simultaneously; or RSs or channels associated with the same group are not capable of being received simultaneously, or RSs or channels that are associated with the same group and that have different spatial relationships or different spatial filters are not capable of being received simultaneously.

In an embodiment, the reference channel or signal associated with the class C group satisfies at least one of: RSs or channels associated with different groups are not capable of being sent simultaneously; RSs or channels associated with different groups are not capable of being received simultaneously; RSs or channels associated with the same group are capable of being sent simultaneously, or RSs or channels that are associated with the same group and that have different spatial relationships or different spatial filters are capable of being sent simultaneously; or RSs or channels associated with the same group are capable of being received simultaneously, or RSs or channels that are associated with the same group and that have different spatial relationships or different spatial filters are capable of being received simultaneously.

For technical details, reference is made to the embodiments described above, and they will not be repeated herein.

An embodiment of the present application provides a base station. The base station includes a memory and a processor, where the memory stores a program which, when read and executed by the processor, implements the transmission control method described above. For the schematic diagram of the architecture of the memory and the processor, reference is made to FIG. 7.

Figure 9:
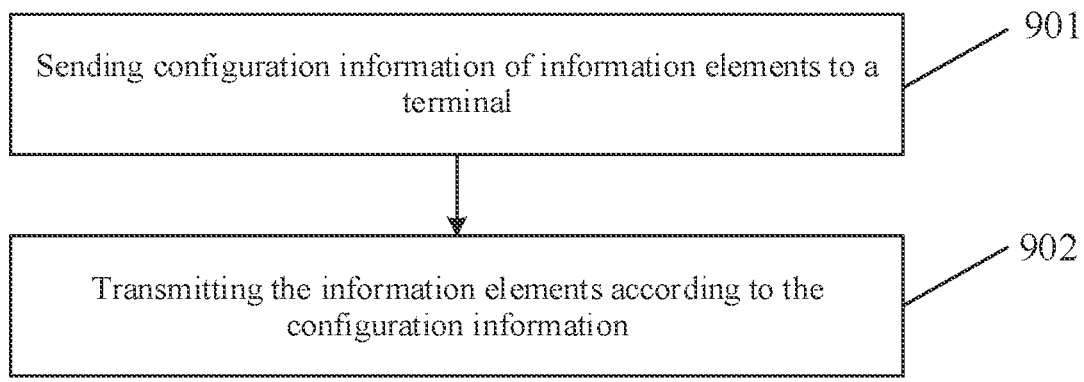
FIG. 9 is a flowchart of a transmission control method on the base station side according to another embodiment of the present application.

As shown in FIG. 9, an embodiment of the present application provides a transmission control method. The method includes the steps described below.

In step 901, configuration information of information elements is sent to a terminal, where the configuration information satisfies at least one of the following conditions in response to the information elements being transmitted simultaneously: spatial relationships or spatial filters associated with the information elements are the same, or spatial relationships or spatial filters associated with the information elements under the same group are the same.

In step 902, the information elements are transmitted according to the configuration information.

In an embodiment, the information elements include at least one of: A1 RSs, A2 data channels, or A3 control channels, where A1, A2, and A3 are integers greater than or equal to 1.

In an embodiment, the spatial relationships being the same includes the presence of at least one RS that simultaneously is an RS associated with the information elements.

In an embodiment, the RS is located in a preset cell, a preset carrier, a preset BWP, a preset control resource set, a preset uplink control channel group, a preset group, or a preset RS resource set.

In an embodiment, the RS is located in a master cell or a master carrier.

In an embodiment, in response to the information elements including an uplink RS, the RS associated with the information elements includes at least one of: the uplink RS, or an RS associated with spatial relationship information of the uplink RS.

In an embodiment, in response to the information elements including an uplink data channel, the RS associated with the information elements includes at least one of: an uplink RS associated with the uplink data channel, an RS associated with spatial relationship information of an uplink RS associated with the uplink data channel, or an RS associated with spatial relationship information of an uplink control channel associated with the uplink data channel.

In an embodiment, the uplink RS associated with the uplink data channel is used for a codebook mode, or the uplink RS associated with the uplink data channel is used for a non-codebook mode.

In an embodiment, in response to the information elements including an uplink control channel, the RS associated with the information elements includes an RS associated with spatial relationship information of the uplink control channel.

In an embodiment, in response to part of information elements in the information elements not being configured with spatial relationship information, a spatial relationship or a spatial filter associated with the part of information elements not being configured with the spatial relationship information in the information elements is determined according to at least one of the following: determining the spatial relationship of the part of information elements not being configured with the spatial relationship according to spatial relationship information of information elements configured with spatial relationship information; determining the spatial filter of the part of information elements not configured with the spatial relationship according to spatial relationship information of information elements configured with spatial relationship information; or determining the spatial filter of the part of information elements not configured with the spatial relationship according to a spatial filter associated with spatial relationship information of information elements configured with spatial relationship information.

An embodiment of the present application provides a base station. The base station includes a memory and a processor, where the memory stores a program which, when read and executed by the processor, implements the transmission control method described above. For the schematic diagram of the memory and the processor, reference is made to FIG. 7.

An embodiment of the present application provides a computer-readable storage medium. The computer-readable storage medium stores one or more programs executable by one or more processors to implement the transmission control method described in any one of above embodiments.

Figure 10:
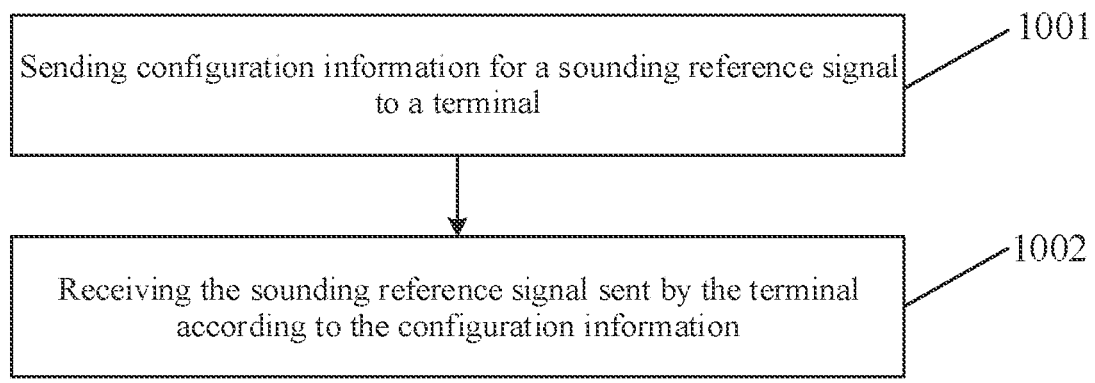
FIG. 10 is a flowchart of an SRS transmission method on the base station side according to an embodiment of the present application.

As shown in FIG. 10, an embodiment of the present application provides an SRS transmission method. The method includes the steps described below.

In step 1001, configuration information of an SRS is sent to a terminal.

In step 1002, the SRS sent by the terminal according to the configuration information is received, where the SRS includes N SRS resource sets, and each of the N SRS resource sets includes at least one SRS resource, where N is a positive integer greater than or equal to 1.

The at least one SRS resource in the same SRS resource set is associated with different spatial relationship information, or the at least one SRS resource in the same SRS resource set is associated with different spatial filters.

In an embodiment, the at least one SRS resource in the same SRS resource set is each configured with spatial relationship information or is not configured with spatial relationship information.

In an embodiment, the at least one SRS resource in the same SRS set being associated with different spatial filters includes:

In response to the at least one SRS resource in the same SRS resource set each not being configured with the spatial relationship information, the at least one SRS resource in the same SRS resource set is associated with different spatial filters.

In an embodiment, the SRS is used for at least one of: a codebook transmission, a non-codebook transmission, or beam management.

In an embodiment, the method further includes: in response to the SRS being used for the non-codebook transmission, at least one of the following in the SRS needs to be configured: spatial relationship information or associated CSI-RS information.

In an embodiment, in a case where the SRS is used for the beam management, the following condition is satisfied: the number of SRS resources in each SRS resource set is less than or equal to the maximum number of SRS resources in each associated SRS resource set in user capability information.

In an embodiment, the method further satisfies at least one of the following conditions: a quasi co-location spatial parameter is capable of being configured, spatial relationship information is capable of being configured, or the SRS is in a second frequency band.

An embodiment of the present application provides a base station. The base station includes a memory and a processor, where the memory stores a program which, when read and executed by the processor, implements the SRS transmission method described in the above embodiment. For the schematic diagram of the architecture of the memory and the processor, reference is made to FIG. 7.

An embodiment of the present application provides a terminal. The terminal includes a memory and a processor, where the memory stores a program which, when read and executed by the processor, implements the SRS transmission method described in any one of the above embodiments. For the schematic diagram of the architecture of the memory and the processor, reference is made to FIG. 7.

An embodiment of the present application provides a computer-readable storage medium. The computer-readable storage medium stores one or more programs executable by one or more processors to implement the SRS transmission method described in any one of the above embodiments.

It is to be understood by those of ordinary skill in the art that all or some of the steps and systems in the methods disclosed herein and all or some of the functional modules/units in the apparatuses disclosed herein may be implemented as software, firmware, hardware or a suitable combination thereof. In the hardware implementation, the division of the functional modules/units mentioned above may not correspond to the division of physical components. For example, one physical component may have multiple functions, or one function or step may be performed jointly by several physical components. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer-storage medium includes, but is not limited to, a random access memory (RAM), a read-only memory (ROM), an electrically erasable programmable read-only memory (EEPROM), a flash memory, or other memory technologies, a compact disc read-only memory (CD-ROM), a digital versatile disc (DVD) or other optical disc storage, a magnetic cassette, a magnetic tape, disk storage or other magnetic storage apparatus, or any other medium used to store the desired information and accessible by a computer. Moreover, it is known to those of ordinary skill in the art that communication media typically include computer-readable instructions, data structures, program modules or other data in modulated data signals such as carrier waves or other transport mechanisms and may include any information delivery medium.

What is claimed is:

1. A transmission control method, comprising:
   receiving configuration information sent from a network side, the configuration information comprising an association relationship between a reference signal resource set index and a sounding reference signal resource set, wherein the sounding reference signal resource set has an association relationship with a channel; and
   determining a receiving mode or a sending mode of the channel associated with the sounding reference signal resource set according to the reference signal resource set index.

2. The method of claim 1, wherein the determining the receiving mode or the sending mode of the channel associated with the sounding reference signal resource set according to the reference signal resource set index comprises:
   transmitting the channel associated with the sounding reference signal resource set using a physical resource group associated with the reference signal resource set index.

3. The method of claim 1, wherein a group associated with the reference signal resource set index comprises at least one of: a class A group, a class B group, or a class C group.

4. The method of claim 3, wherein each group in the class A group comprises at least one antenna panel.

5. The method of claim 3, wherein each group in the class B group comprises at least one antenna sub-panel.

6. The method of claim 3, wherein each group in the class C group comprises at least one beam.

7. The method of claim 3, wherein a reference channel or a signal associated with the class A group satisfies at least one of:
reference signals or channels associated with different groups are capable of being sent simultaneously;
reference signals or channels associated with different groups are capable of being received simultaneously;
reference signals or channels associated with a same group are not capable of being sent simultaneously, or reference signals or channels that are associated with a same group and that have different spatial relationships or different spatial filters are not capable of being sent simultaneously; or
reference signals or channels associated with a same group are not capable of being received simultaneously, or reference signals or channels that are associated with a same group and that have different spatial relationships or different spatial filters are not capable of being received simultaneously.

8. The method of claim 3, wherein a reference channel or a signal associated with the class A group satisfies at least one of:
no more than E reference signals or channels associated with a same group are capable of being sent simultaneously, or no more than E reference signals or channels that are associated with a same group and that have different spatial relationships or different spatial filters are capable of being sent simultaneously;
no more than E reference signals or channels associated with a same group are capable of being received simultaneously, or no more than E reference signals or channels that are associated with a same group and that have different spatial relationships or different spatial filters are capable of being received simultaneously;
more than E reference signals or channels associated with a same group are not capable of being sent simultaneously, or more than E reference signals or channels that are associated with a same group and that have different spatial relationships or different spatial filters are not capable of being sent simultaneously; or
more than E reference signals or channels associated with a same group are not capable of being received simultaneously, or more than E reference signals or channels that are associated with a same group and that have different spatial relationships or different spatial filters are not capable of being received simultaneously;
wherein the E is an integer greater than or equal to 1.

9. The method of claim 3, wherein the class A group comprises E class B groups, wherein E is an integer greater than or equal to 1.

10. The method of claim 3, wherein a reference channel or a signal associated with the class B group satisfies at least one of:
reference signals or channels associated with different groups are capable of being sent simultaneously;
reference signals or channels associated with different groups are capable of being received simultaneously;
reference signals or channels associated with a same group are not capable of being sent simultaneously, or reference signals or channels that are associated with a same group and that have different spatial relationships or different spatial filters are not capable of being sent simultaneously; or
reference signals or channels associated with a same group are not capable of being received simultaneously, or reference signals or channels that are associated with a same group and that have different spatial relationships or different spatial filters are not capable of being received simultaneously.

11. The method of claim 3, wherein a reference channel or a signal associated with the class C group satisfies at least one of:
reference signals or channels associated with different groups are not capable of being sent simultaneously;
reference signals or channels associated with different groups are not capable of being received simultaneously;
reference signals or channels associated with a same group are capable of being sent simultaneously, or reference signals or channels that are associated with a same group and that have different spatial relationships or different spatial filters are capable of being sent simultaneously; or
reference signals or channels associated with a same group are capable of being received simultaneously, or reference signals or channels that are associated with a same group and that have different spatial relationships or different spatial filters are capable of being received simultaneously.

12. A computer-readable storage medium, storing at least one program executable by at least one processor to implement the transmission control method of claim 1.

13. A transmission control method, comprising:
sending configuration information a terminal, the configuration information comprising an association relationship between a reference signal resource set index and sounding reference signal resource set, wherein the sounding reference signal resource set has an association relationship with a channel; and
determining a receiving mode or a sending mode of the channel associated with the sounding reference signal resource set according to the reference signal resource set index.

14. The method of claim 13, wherein the determining the receiving mode or the sending mode of the channel associated with the sounding reference signal resource set according to the reference signal resource set index comprises:
transmitting the channel associated with the sounding reference signal resource set using a physical resource group associated with the reference signal resource set index.

15. A base station, comprising a memory and a processor, wherein the memory stores a program which, when read and executed by the processor, implements the transmission control method of claim 13.

16. A computer-readable storage medium, storing at least one program executable by at least one processor to implement the transmission control method of claim 13.

17. A terminal, comprising a memory and a processor, wherein the memory stores a program which, when read and executed by the processor, implements a transmission control method, and the transmission control method comprises:
receiving configuration information sent from a network side, the configuration information comprising an association relationship between a reference signal resource set index and a sounding reference signal resource set, wherein the sounding reference signal resource set has an association relationship with a channel; and determining a receiving mode or a sending mode of the channel associated with the sounding reference signal resource set according to the reference signal resource set index.

\* \* \* \* \*